United States Patent [19]

Chiu et al.

[11] Patent Number: 6,076,111

[45] Date of Patent: Jun. 13, 2000

[54] METHODS AND APPARATUSES FOR TRANSFERRING DATA BETWEEN DATA PROCESSING SYSTEMS WHICH TRANSFER A REPRESENTATION OF THE DATA BEFORE TRANSFERRING THE DATA

[75] Inventors: Chan Chiu, Sunnyvale; Steve Morris, Palo Alto; Wu Wang, Los Altos, all of Calif.

[73] Assignee: Pictra, Inc., Sunnyvale, Calif.

[21] Appl. No.: 08/957,219

[22] Filed: Oct. 24, 1997

[51] Int. Cl.[7] ................................................ G06F 15/16
[52] U.S. Cl. ........................................ 709/232; 709/203
[58] Field of Search .................................... 709/232, 203

[56] References Cited

U.S. PATENT DOCUMENTS

| | | | |
|---|---|---|---|
| 5,442,749 | 8/1995 | Northcutt et al. | 709/219 |
| 5,771,355 | 6/1998 | Kuzma | 709/232 |
| 5,790,789 | 8/1998 | Suarez | 709/202 |
| 5,793,966 | 8/1998 | Amstein | 709/203 |
| 5,860,068 | 1/1999 | Cook | 705/26 |
| 5,926,623 | 7/1999 | Tsukakoshi et al. | 707/1 |

*Primary Examiner*—Krisna Lim
*Attorney, Agent, or Firm*—Blakely, Sokoloff, Taylor & Zafman

[57] ABSTRACT

A method for transferring data between processing systems and systems for transferring data. A method in one example creates a first representation of a first digital media which is stored on a first digital processing system. The first representation is compared to a plurality of representations of a corresponding plurality of digital media. Typically, but not necessarily, the plurality of representations are stored on a second digital processing system and the first representation is transmitted to the second digital processing system. The first digital media is transmitted to the second digital processing system if the first representation does not match any of the plurality of representations.

28 Claims, 9 Drawing Sheets

METHODS AND APPARATUSES FOR TRANSFERRING DATA BETWEEN DATA PROCESSING SYSTEMS WHICH TRANSFER A REPRESENTATION OF THE DATA BEFORE TRANSFERRING THE DATA

FIELD OF THE INVENTION

The present invention relates to methods and apparatuses for communicating data between data processing systems, and more particularly, to methods and apparatuses for communicating digital data between digital processing systems.

BACKGROUND OF THE INVENTION

It is often necessary or desirable to transfer data between data processing systems, such as digital processing systems. Typically, the transfer of data requires a modem or other interface to convert from the digital data on a digital processing system to data in other formats, such as analog formats. A typical example involves the use of a computer system with a modem at one location to transfer a data file from that computer system to a remotely located computer system which has its own modem or interface. The transfer of large data files, such as digital pictures, requires considerable time even with high-speed analog modems. The use of other types of modems is less common, although these modems do tend to improve the speed of file transfers between computer systems. Still, considerable time can be required to transfer large files even with these other types of modems.

Typically, the two computer systems establish a communication link and then one computer system begins sending a file or other data to the other computer system. Sometimes, the data is encrypted. Also, sometimes, a hashed or digested version of the file may be transferred with the file in order to allow the recipient of the file to authenticate the validity of the file as received at the second computer system.

These prior approaches to transferring data often result in the transmission of unnecessary data between the computer systems. As a result, considerable time can be spent transferring unneeded data. For example, a file could be transferred from a source computer system to a recipient computer system while that same file already exists on the recipient computer system as no attempt is made to determine whether the recipient already has the file. It should be noted that one solution may involve checking for the file name on the recipient system before sending the file; however, file names can be changed so that a check for the file name may not yield the correct answer. Moreover, even if the file names are not changed, it is still possible to have the same file names for different files by coincidence.

Thus it is desirable to provide a method and apparatus for eliminating the transfer of data between digital processing systems when the transfer is not necessary.

SUMMARY OF THE INVENTION

The present invention discloses methods and apparatuses for transferring data between digital processing systems.

A method in one example of the invention creates a first representation of a first digital media which is stored on a first digital processing system. The first representation is compared to a plurality of representations of a corresponding plurality of digital media. Typically, but not necessarily, the plurality of representations are stored on a second digital processing system, and the first representation is transmitted to the second digital processing system. The first digital media is transmitted to the second digital processing system if the first representation does not match any of the plurality of representations. Normally, the first digital media is transmitted to the second digital processing system only if the first representation does not match any of the plurality of representations.

In one example of the present invention, the representation represents the content as opposed to the file name of the digital media and the representation is derived from this content. In a typical embodiment, the digital media is a digital picture.

Computer systems which employ the methods of the present invention are described, and software which allows the computer system to perform the methods of the present invention is also described.

DETAILED DESCRIPTION

The subject invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail. In the drawings, the same element is labeled with the same reference numeral.

Figure 1:
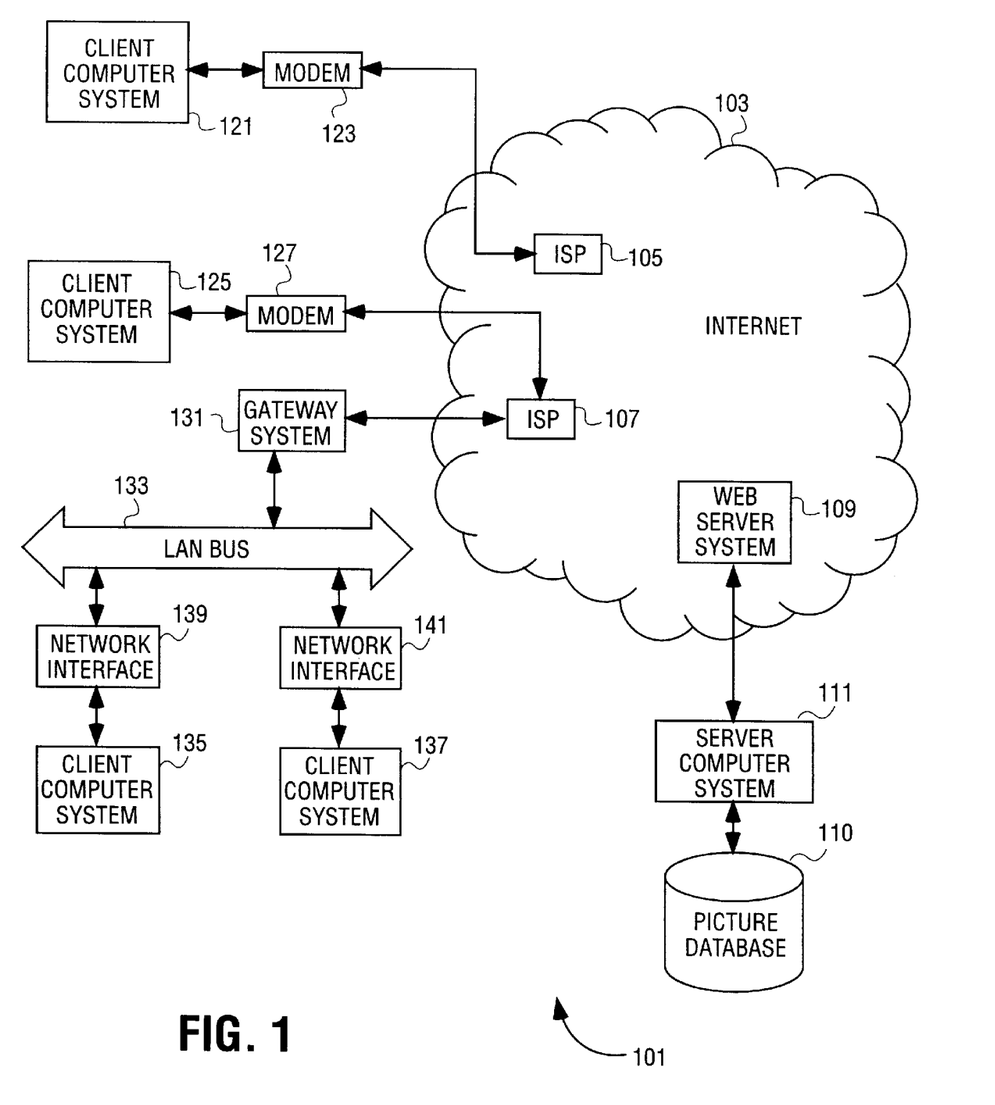
FIG. 1 shows an example of several client computer systems coupled to the Internet and a server computer system with a picture database according to one embodiment of the present invention.

FIG. 1 shows several computer systems which are coupled together through the Internet. It will be appreciated herein that the term "Internet" refers to a network of networks which uses certain protocols (e.g. the TCP/IP protocol, and possibly other protocols such as HTTP for HTML documents). The physical connections of the Internet and the protocols and communication procedures of the Internet are well known to those in the art. Access to the Internet 103 is typically provided by Internet service providers (ISP), such as ISPs 105 and 107. Users on client computer systems, such as client computer systems 121, 125, 135, and 137 obtain access to the Internet 103 through the Internet service providers, such as ISPs 105 and 107. Access to the Internet allows users of the client computer systems to exchange information, receive and send e-mails and view documents, such as documents which have been prepared in the hypertext markup language (HTML) format. These documents are often provided by web servers, such as web server 109 which is considered to be "on" the Internet. Often, these web servers are provided by the ISPs, such as ISP 105, although a computer system may be set up and connected to the Internet without that system being also an ISP as is known in the art. The web server system 109 is typically at least one computer system which operates as a server computer system and is configured to operate with the protocols of the World Wide Web and is coupled to the Internet. Optionally, the web server 109 may be part of an ISP which provides access to the Internet for client systems. The web server 109 is shown coupled to the server computer system 111 which itself is coupled to a picture database 110. It will be appreciated that while two computer systems 109 and 111 are shown in FIG. 1, the web server system 109 and the server computer system 111 may be one computer system having different software components providing the web server functionality and the server functionality provided by server computer system 111, which will be described further below. Client computer systems 121, 125, 135, and 137 may each, with the appropriate web browsing software, view HTML pages provided by the web server 109. The ISP 105 provides Internet connectivity to the client computer system 121 through the modem interface 123 which may be considered part of the client computer system 121. The client computer system may be a "WINTEL" computer system, a network computer, a Web TV system, or other computer systems. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a local area network (LAN). While FIG. 1 shows the interfaces 123 and 127 as a "modem," it will be appreciated that each of these interfaces may be an analog modem, ISDN modem, cable modem, satellite transmission interface (e.g. "Direct PC"), or other interfaces for coupling a computer system to other computer systems. Client computer systems 135 and 137 are coupled to a LAN bus 133 through network interfaces 139 and 141, which may be Ethernet or other network interfaces. The LAN bus is also coupled to a gateway computer system 131 which may provide firewall and other Internet related services for the local area network. This gateway computer system 131 is coupled to the ISP 107 to provide Internet connectivity to the client computer systems 135 and 137. The gateway computer system to 131 may be a conventional server computer system. Also, the web server system 109 may be a conventional server computer system.

Figure 2:
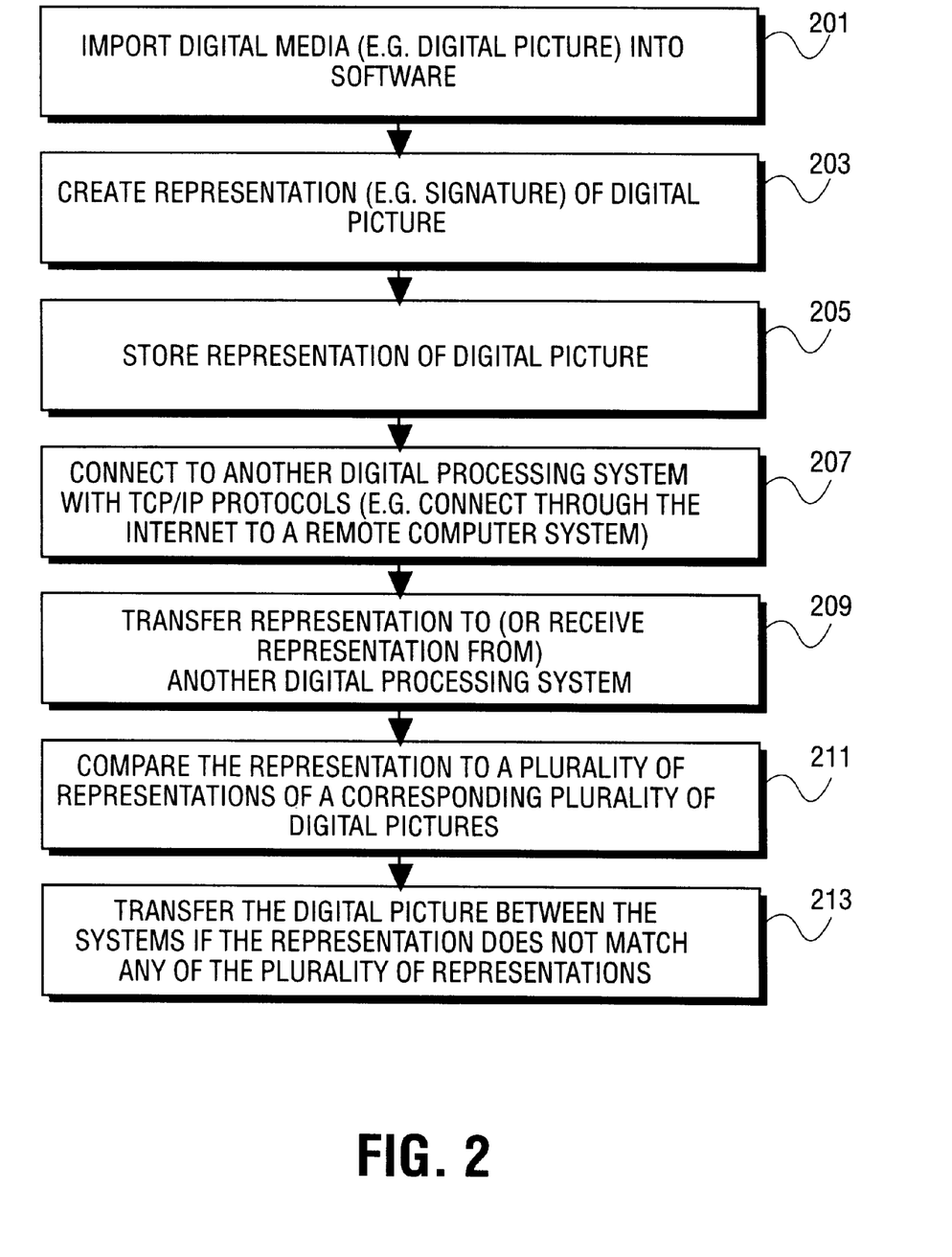
FIG. 2 shows an overview of one method according to one embodiment of the present invention.

One embodiment of the present invention will now be described by referring to FIG. 2 which shows this embodiment. The method of FIG. 2 begins in step 201 in which the user inputs a digital media into software running on a computer system. The digital media may be a digital picture. The computer system may be either a client computer system or a server computer system. In step 203, a representation, such as a signature, of the digital media is created. In one embodiment, this representation is a digest of the digital media; this digest may be created from conventional, commercially available software, such as the MD5 message digest algorithm from RSA Software of Redwood City, Calif. This representation represents the contents of the digital media as opposed to the file name or path name or other file system attributes of the digital media. However, it will be appreciated that the digest may include such attributes or file names in addition to the contents. This representation is derived from the contents of the digital media. It will be appreciated that this representation is not guaranteed to be unique; thus, it is appreciated that it is possible to generate the same representation for a different file or digital media although this is very unlikely. In one embodiment, a digital data stream for a digital picture is digested to produce 16 bytes of data which is the representation of the digital picture. It will also be appreciated that algorithms which provide a larger number of bytes will provide a higher probability of uniqueness.

In an alternative embodiment, the representation may be created by generating a histogram of the color distribution or other patterns of the digital data in the digital picture. Statistical computations may then be performed on this histogram to yield the reasonably unique representation of the picture based on the color distribution for the particular digital picture.

In step 205 the representation of the digital media, such as a digital picture, is stored on the computer system. It will also be appreciated that the original digital media is typically also stored on the same computer system or with the same computer system (e.g. on a network server which is coupled to the computer system).

In step 207, the computer system which created the representation then connects to another computer system. In one embodiment, this connection uses TCP/IP protocols to connect through the Internet to a remote computer system.

In step 209, the representation which was created on one computer system is transferred to another computer system. Alternatively, the computer system which created the representation could also receive at least one other representation from the other computer system. Then in step 211, the representation created in step 203 is compared to a plurality of representations of a corresponding plurality of digital media, such as digital pictures. In step 213, the digital media, such as the digital picture is transmitted between the systems if the representation does not match any of the plurality of representations as determined in the comparison step. In the example of FIG. 2, the system which creates the representation may actually perform the comparison by receiving the plurality of representations from the other digital processing system; however, it is expected that it will be preferred to transfer the representation to the other digital processing system which will compare the plurality of representations which are normally stored on the other digital processing system to the representation that has been transmitted to the other digital processing system. It will be understood that in step 213 no transmission of the digital media, such as the digital picture, will occur between the systems if the representation does match one of the plurality of representations. This will mean that transmission times are reduced because certain files or media do not have to be transferred between the systems. However, it is possible that the digital media should have been transferred because the media does not actually exist on the other computer system even though the representations match. However, this is unlikely particularly as the size of the representation increases as noted above.

Figure 3A:
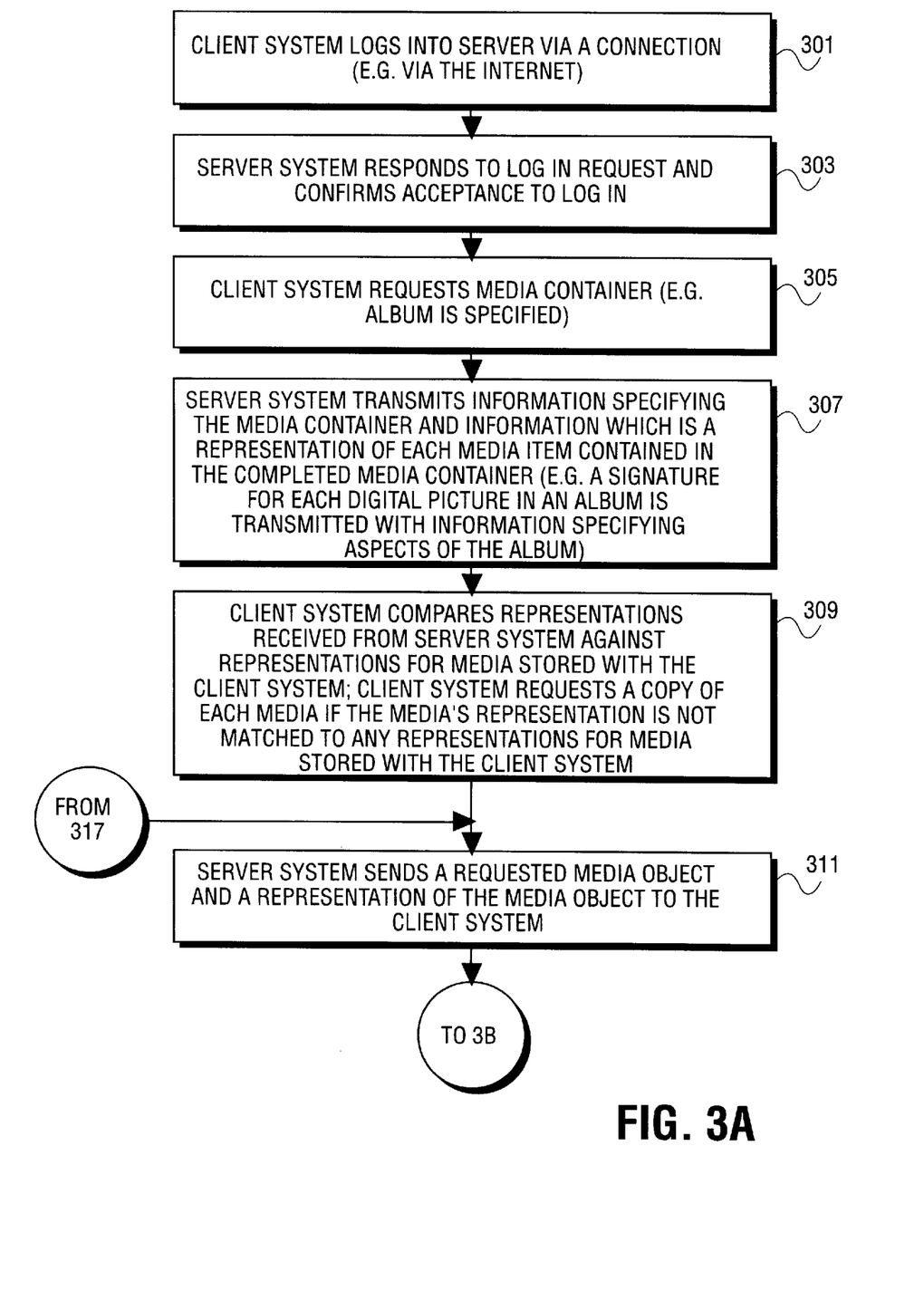
FIGS. 3A and 3B show a particular embodiment for downloading information from a server computer system to a client computer system.
Figure 3B:
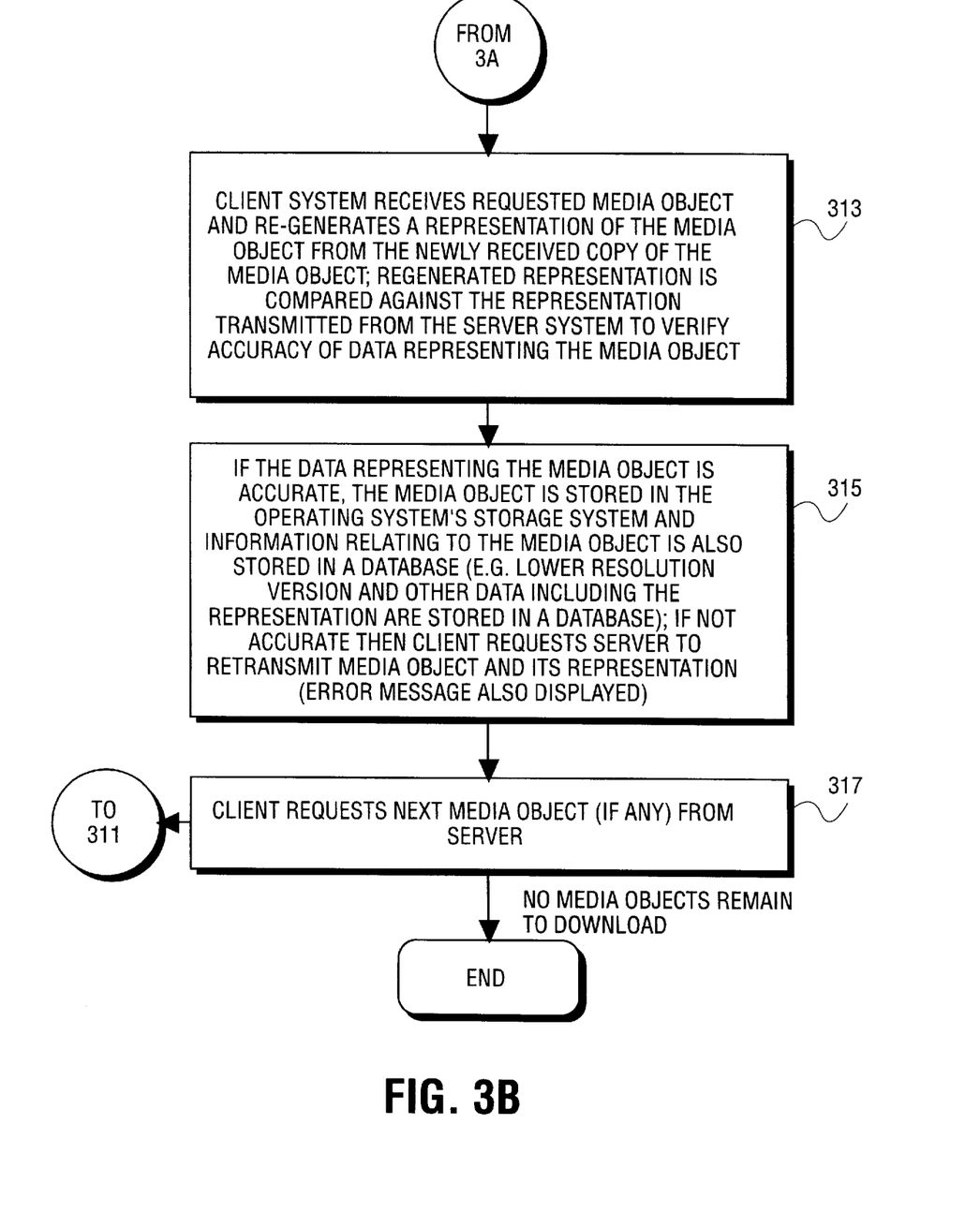

An example of a particular embodiment for downloading several digital media from a server system to client system is shown in the flowcharts of FIGS. 3A and 3B. In step 301, the client system logs into the server system via a connection; typically, this will be via the Internet. The server system in step 303 responds to the log in request and confirms acceptance to the log in. Typically, the log in request will require an identification of the user of the client computer system and may also require a password or some other authenticating data. In step 305, the client computer system requests a media container. In one particular example, the media container is a picture album which has a collection of pictures dispersed among multiple pages. Typically, there are several pictures on a page in the album and there are several pages in the picture album. In one embodiment, the client system is requesting the server to download a picture album from the server system. Referring to FIG. 1, a client computer system may be client system 121 and the server computer system may be server computer system 111 which is coupled to a picture database 110 which includes data relating to the media container, such as a picture album. The web server computer system 109 provides an interface between the client computer system 121 and the server computer system 111. In step 307, the server computer system, such as the server computer 111 transmits information specifying the media container and information which is a representation of each media item, such as a digital picture, contained in the assembled media container. In the example shown in FIG. 1, the server computer system 111 would transfer the information specifying the media container and the representations of each media item through the web server system 109 and the ISP 105 to the client computer system 121 or to other client computer systems. In a particular example of this method, a signature for each digital picture in the picture album is transmitted with the information which specifies aspects of the album. Aspects of the album which may be specified include the layout of the album which indicates the number of pages in the album and the number of pictures on each page and their location on each page. Digital data for the contents of the pictures is not yet transmitted. In step 309, the client system compares the representations received from the server system against representations from media stored with the client system. Typically, this media stored with the client system will be on a local hard disk or other mass storage device or may be on a server on a local area network to which the client computer system is coupled. In step 309, the client system requests a copy of each digital media if the media's representation is not matched to any representations for media stored with the client system. In this manner, the client computer system requests only copies from the server system of each media for which it does not already have a copy.

In step 311, the server system responds by sending a requested media object and a representation of the media object to the client system. The client system in step 313 receives the requested media object and regenerates a representation of the media object from the newly received copy of the media object. The regenerated representation is then compared against the representation transmitted in step 311 from the server system to verify the accuracy of the data representing the media object. Typically, a check sum of the regenerated representation may be compared against the check sum for the representation transmitted from the server system in step 311.

If the data representing the media object is accurate as indicated by matching check sums, then the media object is stored in operating system's storage system of the client system and information relating to the media object is also stored in a database which may be maintained on the client computer system. This database, in one embodiment, may include a lower resolution version of the media object, such as a digital picture, and other data including the representation for the media object. If the data representing the media object is not accurate (as indicated by check sums which do not match) then the client system requests the server system to retransmit the media object and its representation; an error message may also be displayed to the user of the client computer system. The user may also have an opportunity to prevent the retransmission or request for a retransmission. In step 317 the client system requests the next media object if any remains from the server and processing proceeds back to step 311 if further media objects have been requested by the client system. If no further objects remain to be downloaded then processing ends after step 317.

Figure 4A:
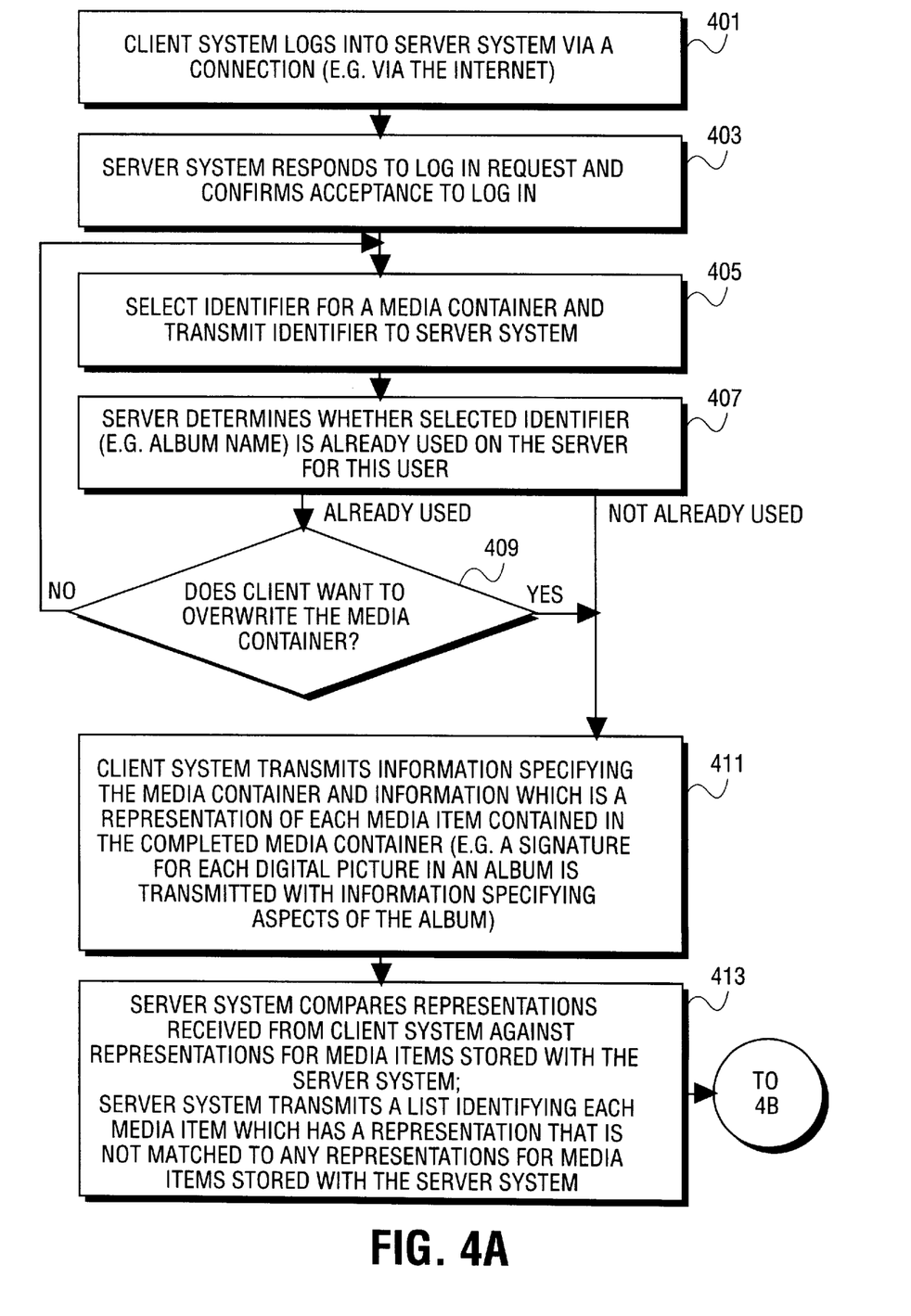
FIGS. 4A and 4B show one example of one embodiment of the present invention for uploading information from a client computer system to a server computer system.
Figure 4B:
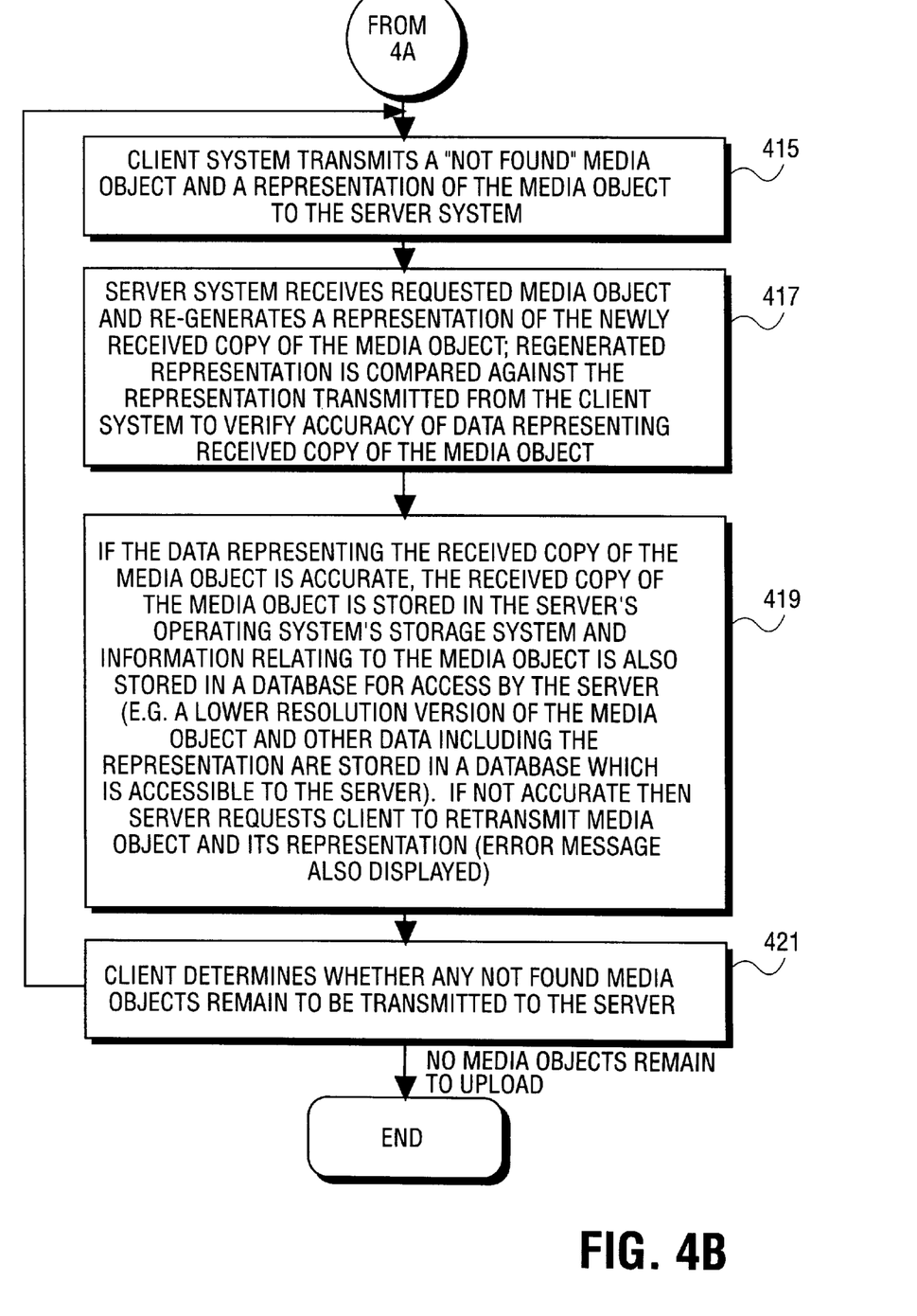

FIG. 4A and FIG. 4B are flowcharts illustrating a particular embodiment of the present invention in which a client system uploads digital media to a server computer system. Thus in the example shown in FIG. 1, digital media, such as several digital pictures in a picture album may be uploaded from client computer system 125 through the ISP 107 to the server system 111 through the web server 109 in order to "publish" the picture album on the web server 109. The web server 109 will then allow others to view the pictures in the album from a web browser. That is, users of other client systems, such as client computer system 121 or client computer system 135 may view the album with its associated pictures which is presented by the web server 109. Referring back to FIG. 4A, in step 401 the client system logs into the server system via a connection. In one embodiment, this connection is via the Internet. In step 403 the server system responds to the log in request from the client system and confirms acceptance to the log in. In one embodiment, the log in request may include the user's name or other identification and some password or other authentication of the user.

In step 405 the user at the client system selects an identifier for a media container, such as an album name for a picture album and transmits this identifier to the server system. The server system in step 407 determines whether the selected identifier, such as an album name, is already used on the server for this user. The server may maintain data for a number of different albums for a particular user and may also maintain other albums for other users. The server in step 407 determines whether the selected identifier identifies a particular album already being maintained on the server for this particular user. If the album is already being used or being maintained, then processing proceeds to step 409 in which the server returns a query to the client system. In this query, the client system is requested whether or not it wishes to overwrite the existing media container. That is, the user of the client system is requested to answer whether or not the media container, such as a picture album, is to be overwritten with new data. If in response to the query of step 409, the user indicates that the data is to be overwritten then processing proceeds from step 409 to step 411. If the user indicates in step 409 that the data is not to be overwritten then processing proceeds from step 409 back to step 405 and a message is displayed to the user requesting the user to select a name for a new media container. If in step 407 the server determines that the selected identifier is not already used (e.g. a new media container is to be created) then processing proceeds from step 407 directly to step 411.

In step 411, the client system transmits information specifying the media container and information which is a representation of each media item contained in the assembled media container. In one embodiment, the representation is a signature for each digital picture in a picture album, and this signature is transmitted with the information specifying aspects of the picture album. In step 413, the server system compares representations received from the client system against representations for media items stored with the server system. In one embodiment, referring back to FIG. 1, the server computer system 111 maintains a picture database for the particular user; this picture database is contained within database 10 and typically is for many users. The representations from the client system are transmitted through the web server system 109 to the server system 111 and these representations from the client computer system are compared against the representations for the media items stored with the server system for the user who logged in in step 401. This comparison will indicate that a media item is already present on the server by showing a match between a representation transmitted from the client and a representation for the media item stored with the server system. The server system determines which media items are already present in the picture database 110 for the particular user and then transmits to the client system a list of each media item which is not present on the server system based upon determining that the media's representation transmitted from the client system is not matched to any representations for the media stored with the server system for the particular user. This list may be referred to as a "Not Found" list in that it indicates which media items were not found on the server system based on searching the media representations at the server. The list may additionally include a list of media items which were found at the server system (based upon a match between the respective representations). It will be appreciated that in an alternative embodiment the server system may compare the representations received from the client system to all representations for all users in the picture database 110.

In step 415, the client system transmits a media object on the "Not Found" list and a representation of this media object to the server system. The client system transmits each media item only if the representation for the media item is not stored with the server system. Thus the client system only transmits those media objects which are not already present on the server rather than transmitting all media objects which may be in an assembled media container, such as a fully assembled picture album. In step 417, the server system receives the transmitted media object and regenerates a representation from the newly received copy of the media object. This regenerated representation is compared against the representation transmitted from the client system in step 415 to verify the accuracy of the data representing the received copy of the media object. It will be appreciated that the regenerated representation may be compared against the representation transmitted from the client in step 411 rather than the representation transmitted in step 415.

If the data representing the received copy of the media object is accurate (e.g. as determined by comparing the check sum for the regenerated representation against the check sum of the representation transmitted from the client computer system in 415) then the received copy of the media object is stored in the server's operating system file storage system and information relating to the media object is also stored in a database for access by the server. Further details regarding storage of the various objects will be described with reference to FIGS. 6 and 7 below for a particular embodiment of the present invention. In one example, a lower resolution version of the media object and other data including the representation are stored in a database which is accessible to the server. This lower resolution version of the media object is often a web viewable image, such as a JPEG file which may be viewed in documents having the HTML format. If the data representing the received copy of the media object is not accurate, then the server requests the client to retransmit the media object and its representation and may also cause an error message to be displayed to the client's user. Optionally, the user may decide to not retransmit the media object.

Step 421 follows in which the client system determines if there are further media objects that are required to be transmitted from the client to the server as determined by the comparison step of step 413. If there are further media objects which need to be transmitted, then processing proceeds from step 421 back to step 415. If no further media objects need to be uploaded, then the process ends as shown in FIG. 4B.

Figure 5:
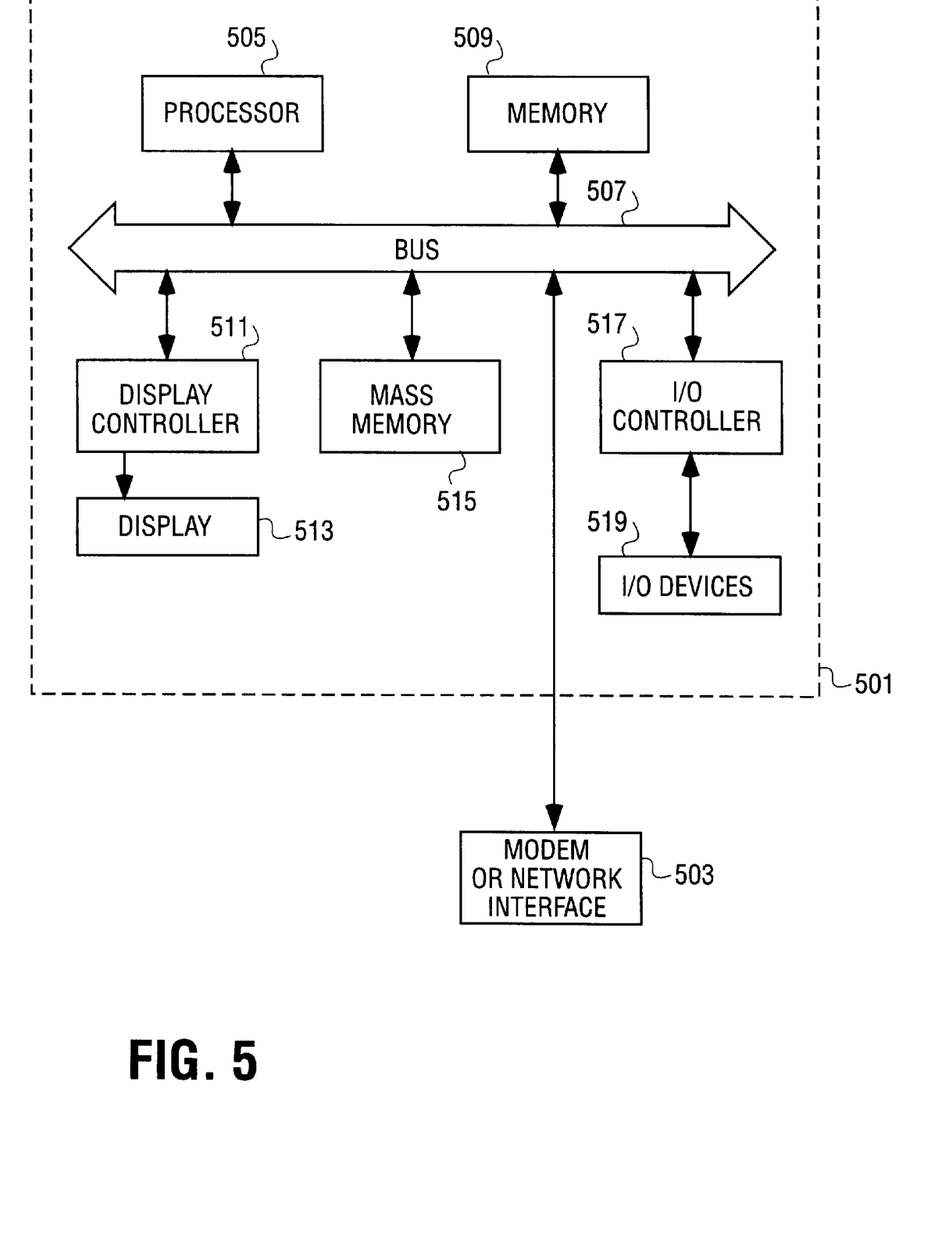
FIG. 5 shows an example of a computer system which may be used with the present invention.

FIG. 5 shows one example of a computer system which may be used as either a client computer system or a server computer system or as a gateway system or as a web server system. It will also be appreciated that such a computer system may be used to perform many of the functions of Internet service providers, such as ISP 105. The computer system 501 interfaces to external systems through the modem or network interface 503. It will be appreciated that the modem or network interface 503 may be considered to be part of the computer system 501. This interface 503 may be an analog modem, ISDN modem, cable modem, token ring interface, satellite transmission interface (e.g. "Direct PC"), Ethernet interface, or other interface for coupling a computer system to other computer systems. The computer system 501 includes a processor 505 which may be a conventional microprocessor, such as an Intel Pentium microprocessor or Motorola Power PC microprocessor. Memory 509 is coupled to the processor 505 by a bus 507. Memory 509 may be dynamic random access memory (DRAM) and may also include static RAM (SRAM). The bus 507 couples the processor 505 to the memory 509 and also to mass memory 515 and to display controller 511 and the I/O (input/output) controller 517. The display controller 511 controls display on a display device, such as a CRT or a liquid crystal display, shown generically as display 513. The input/output devices 519 may include a keyboard, disk drives, printers, a digital camera, a scanner, and other input and output devices, including a mouse or other pointing device. Display controller 511 and the I/O controller 517 may be implemented with conventional well known technology. The mass memory 515 is often a magnetic hard disk, an optical disk, or another form of storage for large amounts of data which are often written, by a DMA process, into memory 509 during execution of software in the computer system 501. It will be appreciated that the computer system 501 is one example of many possible computer systems which have different architectures. For example, WINTEL systems (systems which run a Microsoft Windows operating system on an Intel microprocessor) often have multiple busses, one of which may be considered a peripheral bus. Network computers may also be considered to be a computer system which may be used with the present invention. Network computers may not include a hard disk or other mass storage, and executable programs are loaded from a network into memory 509 for execution by the processor 505. A Web TV system, which are known in the art, may also be considered to be a computer system according to the present invention, but it may not include certain features shown in FIG. 5, such as certain input or output devices. A typical computer system will usually include at least a processor, memory, and a bus coupling the memory to the processor.

Figure 6:
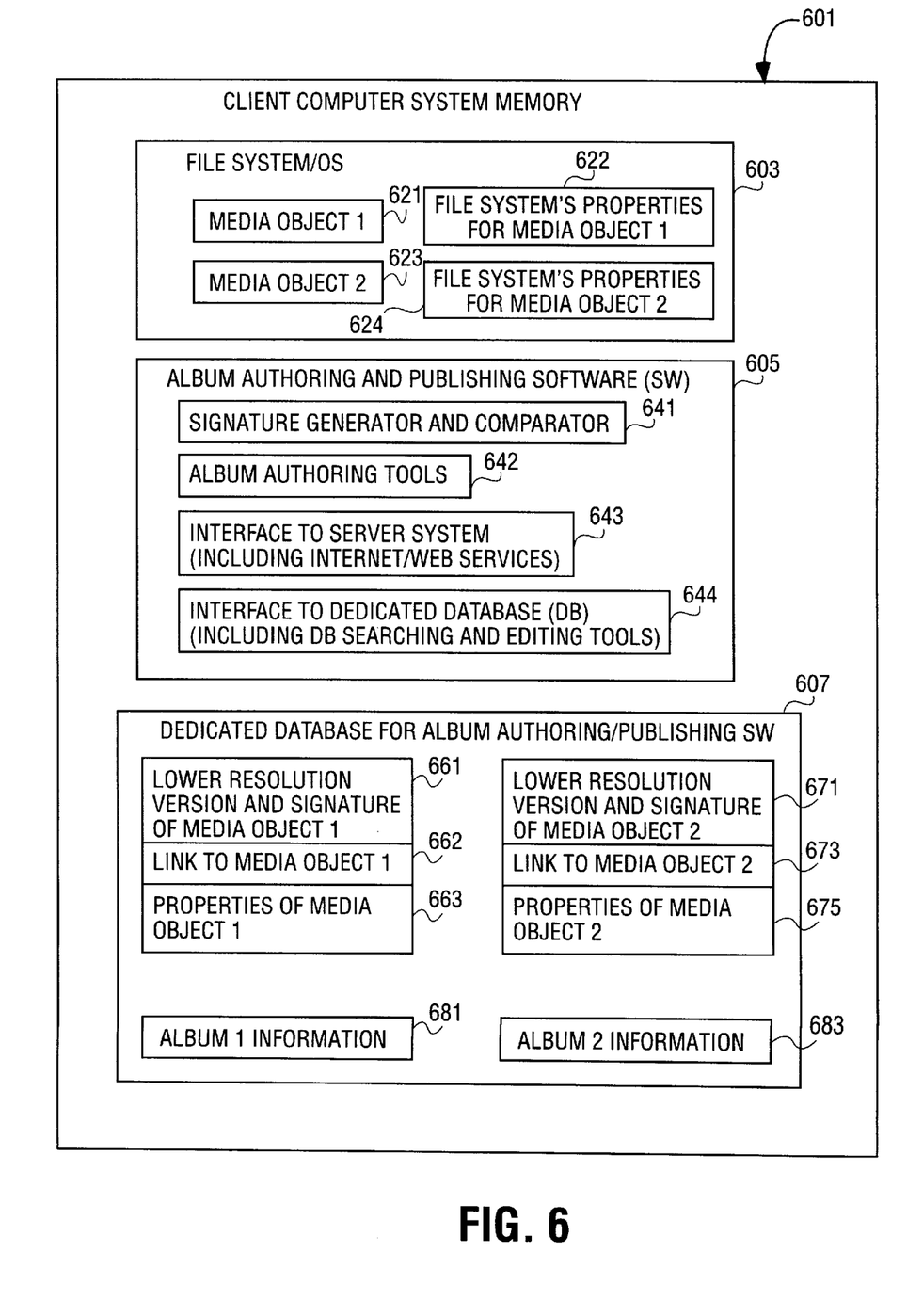
FIG. 6 shows an example of a computer readable storage medium for a client computer system which may be used with one aspect of the present invention.
Figure 7:
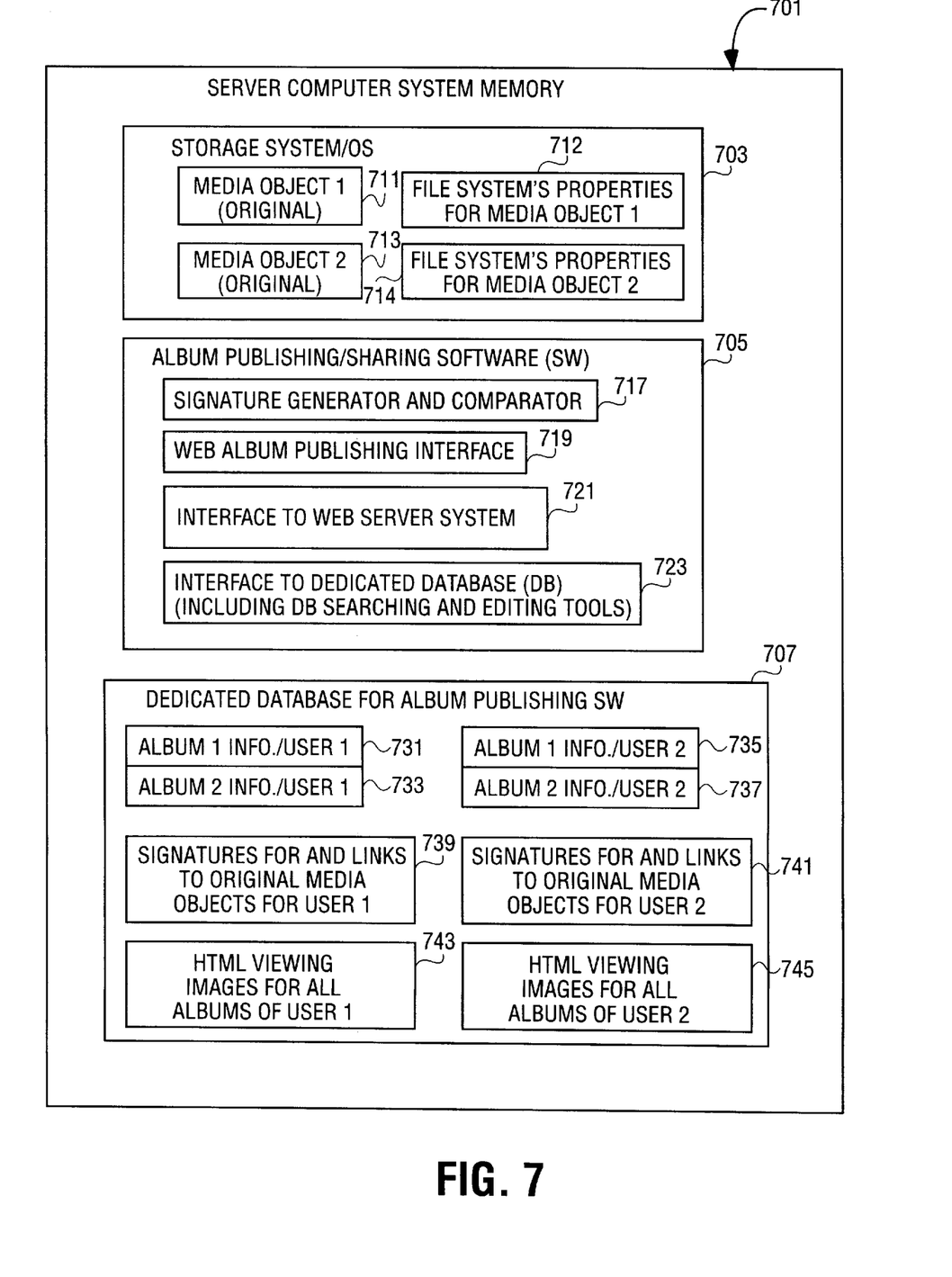
FIG. 7 shows a computer readable storage medium for a server computer system which may be used with one aspect of the present invention.

FIGS. 6 and 7 illustrate examples according to one embodiment of the present invention for two different computer readable storage media. It will be appreciated that the actual memory which stores this information may be different elements, such as the memory 509 and the mass memory 515 or they may be the same element, such as the mass memory 515. In one example of a network computer where there is no non-volatile mass memory, the necessary software files and data files may be downloaded to the memory 509 for execution in a processor in a network computer. In this case, the memory 509 provides the computer readable storage medium.

FIG. 6 illustrates an example of a computer readable storage medium containing various elements which are used with one embodiment of the present invention. The medium 601 includes a file system and an operating system (OS) element or module 603 which is used to control the file system for the client computer system as well as providing the operating system support such as the disk operating system and other aspects of the operating system. Another element is the album authoring and publishing software 605 which is used to create and modify albums and to interface with the server system in order to publish and/or share those albums. Another element is a dedicated database which is dedicated to the album authoring/publishing software. This database element 607 includes information for the various pictures in the various albums a user may create. While digital pictures represent one embodiment of the present invention, it will be appreciated that digital media or media objects refers generally to audio digital media, video digital media and software files, such as a word processing file created by a word processing computer program. However, the preferred embodiment is one in which the digital media or digital pictures are assembled into a picture album, where the album has multiple pages and where at least some of the pages include multiple pictures.

As shown in FIG. 6, the file system/OS element 603 includes media objects 621 and 623 which are the actual binary data of two different media objects, media object 1 and media object 2, stored on a hard disk or other media under control of the disk operating system. The disk operating system creates file system properties, such as properties 622 and 624 which specify various file system related properties for the two media objects. These include file size, date of creation, and document type (e.g. JPEG, BMP, etc.). The album authoring and publishing software element 605 includes four modules 641, 642, 643, and 644. The signature generator and comparator 641 is the executable computer program for generating and comparing the signatures or representations according to the present invention. The album authoring tools 641 allows a user to create a picture album by selecting layout information which specifies the number and location of pictures on a page throughout multiple pages of a picture album. The interface to server system module 643 includes Internet and web services allowing the client computer system which includes the computer readable memory 601 to interface with a server system, such as the server computer 111 of FIG. 1. The interface to dedicated database module 644 includes database searching and editing tools allowing the album authoring and publishing software to search and edit the dedicated database 607.

FIG. 6 shows an example of the dedicated database 607. It will be appreciated that data may be stored in other formats and ways in this database. As shown in FIG. 6, for each media object, there is stored in the database a lower resolution version of the digital picture as well as the signature of the media object and a link to the original (higher resolution) media object as well as information indicating the properties of the media object. Thus, the lower resolution and signature of media object 1 is stored with a link to the original media object 621 stored in the file system as well as the properties of the media object 1, which properties are typically in addition to the file system's properties 622. Similarly, for media object 2, there is stored a lower resolution version, such as a thumbnail image, of the media object 2 and the signature or representation of the media object 2. There is also a link or pointer to the original media object 2 which is the media object 623 maintained by the file system. Further, there are properties for the media object 2 which are in addition to the properties 624. The database 607 further includes information specifying layout and other information for album 1, labeled as information 681, and information 683 specifies information for a second album which may include different pictures than album 1 or may include some of the same pictures as album 1.

In one embodiment, the client computer system's computer readable media 601 may at some time be entirely stored in non-volatile mass memory, such as a hard disk. At other times, the various elements shown in FIG. 6 may be dispersed between dynamic memory, such as memory 509, and a mass memory, such as mass memory 515.

FIG. 7 shows an example of the computer readable storage medium 701 which may be used with a server computer system of the present invention. This memory, which again may be dispersed among memory elements or may be stored entirely on a hard disk or other non-volatile storage media, includes three elements which are the file system/operating system element 703, the album publishing/sharing software 705, and the dedicated database for the album publishing software 707.

The file system and operating system element 703 includes the original, higher resolution media objects 1 and 2 shown as elements 711 and 713. These elements are the actual digital (or other) data of the media object stored on the computer readable medium under control of the file or storage system such as a disk operating system. The file storage system also stores properties which are the file system's properties for the media object, such as properties 712 and 714. These properties typically include the file's size for each media object as well as the date of creation, the date of last modification and the type of document. The album publishing/sharing software 705 includes a signature generator and comparator module which is responsible for generating representations or signatures of the media objects and to compare signatures or representations in accordance with the present invention. The web album publishing interface 719 performs functions relating to decoding information with respect to the albums and generating albums as a result of decoding the information specifying album format. The interface to web server system 721 is an optional software module which is used to allow the server computer system 111 to interface with the web server 109. Typically, some services are required in order to interface between the album publishing and sharing software and the software required for providing web server functionality. The interface to the dedicated database element 723 provides for database searching and editing of the dedicated database 707.

The dedicated database 707 includes information 731 for a first album of user 1 and information 733 for a second album of user 1. It also includes information 735 for a first album of a second user and information 737 for a second album of the second user. There is also stored in the database 707 the signatures for and the links to the original media object for the first user. This information may be stored in separate tables or together in one table. The links point back to an original media object, typically by picture name and full path name to the original media object, such as media object 711 as stored in the file or storage system of the server system. The signatures are used when comparing signatures received from the client system when connected with user 1 in the case of the signatures stored with element 739. Also for user 1, the database either stores or refers to a separate storage for the HTML viewing images for all albums of user 1. This element 743 is generated from the media object, such as the original media object 1 stored as element 711 in the file system. Typically, the HTML viewing images are a lower resolution version of the original media object and will be displayed to users when browsing the web server 109. The database 707 contains similar information, such as the elements 741 and 745 for the second user.

The foregoing description has provided numerous examples of the present invention. It will be appreciated that various modifications and changes may be made thereto without departing from the broader spirit and scope of the invention as set forth in the appended claims. Further details concerning particular embodiments of the present invention may also be found in the following copending patent applications which were filed on the same date as this application and which are hereby incorporated herein by reference; these copending applications are as follows: "Methods and Apparatuses for Acquiring a Digital Image for Use in a Digital Processing System" by inventors James Lei and Wu Wang; and "Methods and Apparatuses for Distributing Digital Media over a Digital Network" by inventors Shantanu Narayen, Wu Wang, Steve Morris, Chan Chiu, Cecilia Zhao, Aditya Khosla, James Lei, and Prasad Kongara.

What is claimed is:

1. A method for transferring data between a first digital processing system and a second digital processing system said method comprising:

creating a first representation of a first digital media, said first digital media being stored on said first digital processing system;

comparing said first representation to a plurality of representations of a corresponding plurality of digital media;

transmitting said first digital media from said first digital processing system to said second digital processing system if said first representation does not match any of said plurality of representations.

2. A method as in claim 1 further comprising transmitting said first representation from said first digital processing system to said second digital processing system, and wherein said plurality of representations are stored on said second digital processing system.

3. A method as in claim 2 further comprising sending a message from said second digital processing system, after said comparing step, requesting said first digital processing system to transmit said first digital media to said second digital processing system.

4. A method as in claim 3 further comprising, after said comparing step, creating a second representation of said first digital media and comparing said first representation and said second representation to determine a validity of said first digital media as stored on said second digital processing system.

5. A method as in claim 3 wherein said step of transmitting said first representation occurs before said comparing step and wherein said comparing step is performed at said second digital processing system, and further comprising, after said comparing step, transmitting said first representation from said first digital processing system to said second digital processing system and creating a second representation of said first digital media at said second digital processing system from said first digital media after said first digital media is received at said second digital processing system, and comparing said first representation and said second representation to determine a validity of said first digital media as stored on said second digital processing system.

6. A method as in claim 3 wherein said first representation represents content of said first digital media which is a digital picture and said first representation is derived from said content and wherein said comparing step determines whether said first representation does not match any of said plurality of representations.

7. A method as in claim 6 wherein said plurality of representations is stored in a database which is searched during said comparing step.

8. A method as in claim 6 wherein said corresponding plurality of digital media are stored in a file system on said second digital processing system, each of said corresponding plurality of digital media corresponding to one of said plurality of representations, and wherein said plurality of representations is stored in a database which comprises a lower resolution picture version of each of said corresponding plurality of digital media and an identifier of each of said corresponding plurality of digital media.

9. A method as in claim 8 wherein said database further comprises information describing a media container which causes said second digital processing system to display together images of some of said plurality of digital media on a display, and wherein said information comprises layout information specifying how said some of said plurality of digital media are displayed together.

10. A method as in claim 5 wherein said first representation represents content of said first digital media which is a digital picture and said first representation is derived from said content and wherein said corresponding plurality of digital media are stored in a file system on said second digital processing system, each of said corresponding plurality of digital media corresponding to one of said plurality of representations, and wherein said plurality of representations is stored in a database which comprises a lower resolution picture version of each of said corresponding plurality of digital media and an identifier of each of said plurality of digital media and wherein said database further comprises information describing a media container which causes said second digital processing system to display together images of some of said plurality of digital media on a display, and wherein said information comprises layout information specifying how said some of said plurality of digital media are displayed together.

11. A method as in claim 9 wherein each said identifier is associated with each said lower resolution picture version.

12. A method as in claim 11 wherein each said lower resolution picture version is capable of being viewed by a web browser.

13. A method as in claim 10 wherein each said identifier is associated with each said lower resolution picture version.

14. A method as in claim 3 further comprising transmitting from said first digital processing system to said second digital processing system a media container which comprises layout information specifying how a plurality of images are displayed together.

15. A method as in claim 3 wherein said first digital processing system is a client computer system and said second digital processing system is a server computer system.

16. A method as in claim 3 wherein said first digital processing system is a server computer system and said second digital processing system in a client computer system.

17. A method on a server computer system for transferring data to said server computer system, said method comprising:

receiving a first representation of a first digital media;

comparing said first representation to a plurality of representations of a corresponding plurality of digital media stored with said server computer system;

requesting a copy of said first digital media if said first representation does not match any of said plurality of representations;

receiving said copy of said first digital media if said first representation does not match any of said plurality of representations.

18. A method as in claim 17 wherein said step of receiving a first representation further comprising receiving a plurality of first representations of a corresponding plurality of first digital media and said comparing step further comprising comparing each of said plurality of first representations to said plurality of representations of said corresponding plurality of digital media and wherein said step of receiving said copy occurs only if said first representation does not match any of said plurality of representations.

19. A method as in claim 18 further comprising receiving container information which describes a media container having layout information which specifies how at least some of said corresponding plurality of first digital media are to be displayed together, and wherein said first representation represents content of said first digital media and said first representation is derived from said content.

20. A method as in claim 19 wherein said requesting step further comprises requesting a copy of each of said corresponding plurality of first digital media only if a corresponding first representation of said plurality of first representation does not match any of said plurality of representations.

21. A method as in claim 20 wherein said corresponding plurality of digital media are stored in a file system on said server computer system and wherein said plurality of representations is stored in a database which comprises an identifier of each of said corresponding plurality of digital media.

22. A computer readable storage medium containing executable computer program instructions which when executed by a digital processing system cause the digital processing system to perform a method comprising:

receiving a first representation of a first digital media;

comparing said first representation to a plurality of representations of a corresponding plurality of digital media stored with a computer system;

requesting a copy of said first digital media if said first representation does not match any of said plurality of representations;

receiving said copy of said first digital media if said first representation does not match any of said plurality of representations.

23. A computer readable storage medium as in claim 22 wherein said method, said step of receiving a first representation further comprises receiving a plurality of first representations of a corresponding plurality of first digital media and said comparing step further comprising comparing each of said plurality of first representations to said plurality of representations of said corresponding plurality of digital media and wherein said step of receiving said copy occurs only if said first representation does not match any of said plurality of representations.

24. A computer readable storage medium as in claim 23 wherein said method further comprises receiving container information which describes a media container having layout information which specifies how at least some of said corresponding plurality of first digital media are to be displayed together, and wherein said first representation represents content of said first digital media and said first representation is derived from said content.

25. A computer readable storage medium as in claim 24 wherein said requesting step further comprises requesting a copy of each of said corresponding plurality of first digital media only if a corresponding first representation of said plurality of first representation does not match any of said plurality of representations.

26. A computer readable storage medium as in claim 25 wherein said corresponding plurality of digital media are stored in a file system on said computer system and wherein said plurality of representations is stored in a database which comprises an identifier of each of said corresponding plurality of digital media.

27. A computer readable storage medium as in claim 26 wherein said computer readable storage medium comprises a mass storage device in a server computer system.

28. A computer readable storage medium as in claim 26 wherein said computer readable storage medium comprises a mass storage device in a client computer system.

* * * * *